United States Patent
Tibbenham et al.

(10) Patent No.: US 7,156,598 B2
(45) Date of Patent: Jan. 2, 2007

(54) WAFFLE STUD FOR INSERT MOLDED PLASTIC MEMBERS

(75) Inventors: Patricia Tibbenham, West Bloomfield, MI (US); David Dean, Commerce Township, MI (US); Wieslaw Zaydel, Rochester, MI (US); Michelle Winowski-Zaydel, Oxford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 10/974,051

(22) Filed: Oct. 27, 2004

(65) Prior Publication Data

US 2005/0281634 A1 Dec. 22, 2005

Related U.S. Application Data

(60) Provisional application No. 60/580,697, filed on Jun. 18, 2004.

(51) Int. Cl.
*F16B 39/282* (2006.01)
*F16B 39/02* (2006.01)
*F16B 23/00* (2006.01)

(52) U.S. Cl. .................. 411/82; 411/404; 411/187; 411/188; 411/176; 411/107; 16/430

(58) Field of Classification Search ............. 411/82, 411/176, 187, 188, 409, 410, 404, 107, 180; 16/430
See application file for complete search history.

(56) References Cited

U.S. PATENT DOCUMENTS

| | | | | |
|---|---|---|---|---|
| 1,151,861 A | * | 8/1915 | Brumback | 411/399 |
| 1,910,182 A | | 5/1933 | Robertson | |
| 2,556,155 A | | 6/1951 | Stellin | |
| 2,989,102 A | * | 6/1961 | Del Pesco et al. | 81/19 |
| 3,127,919 A | * | 4/1964 | Swanstrom | 411/188 |
| 3,269,250 A | * | 8/1966 | Curtiss | 411/410 |
| 3,403,718 A | * | 10/1968 | Hughes | 411/180 |
| 3,529,508 A | * | 9/1970 | Cooksey | 411/374 |
| 3,605,845 A | * | 9/1971 | Junker | 411/185 |
| 4,109,691 A | * | 8/1978 | Wilson | 81/119 |
| 4,223,711 A | * | 9/1980 | Tabor | 411/188 |
| 4,281,699 A | * | 8/1981 | Grube | 411/176 |
| 4,452,556 A | * | 6/1984 | Nelson et al. | 411/377 |
| 4,543,023 A | * | 9/1985 | Capuano | 411/180 |
| 4,812,095 A | * | 3/1989 | Piacenti et al. | 411/188 |
| 4,900,208 A | * | 2/1990 | Kaiser et al. | 411/387.1 |
| 4,930,960 A | * | 6/1990 | Jadatz | 411/188 |
| 4,962,806 A | * | 10/1990 | Nottelmann et al. | 164/112 |
| 5,017,068 A | * | 5/1991 | Cooksey | 411/373 |
| 5,222,850 A | * | 6/1993 | Medal | 411/82.1 |

(Continued)

*Primary Examiner*—Katherine Mitchell
(74) *Attorney, Agent, or Firm*—Ford Global Technologies, LLC

(57) ABSTRACT

A fastener is configured for use in the manufacture of molded plastic components that will be subsequently attached to other components by the fastener. The low profile head portion of the fastener has a rounded contoured and convoluted top surface to facilitate the flow of plastic material around the head portion during the molding process. The underside of the head portion is formed with a square face surrounded circumferentially by circumferential land surfaces that provides a high pull-out force resistance for the fastener. The square face on the underside and convoluted top surface of the head portion provides a high spin-out torque resistance without sacrificing the pull-out force resistance. The rounded edges of the head portion are compatible with molding processes to allow the flow of plastic material to fully encapsulate the head portion within the molded plastic component.

12 Claims, 6 Drawing Sheets

U.S. PATENT DOCUMENTS

| | | | |
|---|---|---|---|
| 5,269,208 A * | 12/1993 | Kolvites et al. | 81/176.2 |
| 5,358,368 A | 10/1994 | Conlan | |
| 5,378,101 A * | 1/1995 | Olson et al. | 411/405 |
| 5,480,273 A * | 1/1996 | Jou | 411/373 |
| 5,569,008 A | 10/1996 | Chapkovich | |
| 5,585,581 A * | 12/1996 | Rogers | 84/414 |
| 5,674,037 A | 10/1997 | Lu | |
| 5,683,217 A * | 11/1997 | Walther et al. | 411/399 |
| 5,713,705 A | 2/1998 | Grunbichler | |
| 5,762,457 A * | 6/1998 | Lide | 411/405 |
| 6,017,176 A * | 1/2000 | Marui | 411/82 |
| 6,017,177 A * | 1/2000 | Lanham | 411/410 |
| 6,042,314 A * | 3/2000 | Guelck | 411/399 |
| 6,079,923 A * | 6/2000 | Ross et al. | 411/353 |
| 6,193,456 B1 * | 2/2001 | Stumpf et al. | 411/180 |
| 6,280,131 B1 * | 8/2001 | Ellis et al. | 411/353 |
| 6,302,632 B1 | 10/2001 | Lin | |
| 6,363,579 B1 * | 4/2002 | King, Jr. | 16/441 |
| 6,394,724 B1 * | 5/2002 | Kelly et al. | 411/353 |
| 6,406,376 B1 * | 6/2002 | Lin | 470/63 |
| 6,607,339 B1 * | 8/2003 | Mangapora | 411/107 |
| 6,616,391 B1 * | 9/2003 | Druschel | 411/387.2 |
| 6,637,095 B1 * | 10/2003 | Stumpf et al. | 29/513 |
| 6,682,283 B1 | 1/2004 | Mann | |
| 7,014,406 B1 * | 3/2006 | Robertson | 411/161 |
| 2005/0244248 A1 * | 11/2005 | Avganim | 411/410 |

* cited by examiner

WAFFLE STUD FOR INSERT MOLDED PLASTIC MEMBERS

CROSS-REFERENCE TO RELATED APPLICATIONS

This application claims domestic priority on U.S. Provisional Patent Application Ser. No. 60/580,697, filed Jun. 18, 2004, the contents of which are incorporated herein by reference.

BACKGROUND OF THE INVENTION

Molded plastic parts are utilized in many manufacturing processes. In machinery manufacturing processes, such as the manufacture of automotive vehicles, the plastic parts are attached to other components of the vehicle to create the final assembled product. The attachment of the molded plastic parts to other components typically requires the utilization of fasteners attached to the molded plastic part to permit a selective detachable connection to the component on which the plastic part is to be mounted.

Molding of the plastic part can be accomplished in one of several known processes, including injection molding and blow molding, which can provide finished plastic parts. It is known in the art of molding plastic components to place a fastener into the mold to permit the plastic material to flow around the fastener head and, thereby, incorporate the fastener directly into the molded plastic part. This process is commonly referred to as insert molding. Fasteners having conventional hex heads, square heads, or even carriage heads have been utilized in the insert molding process. By encapsulating the fastener head into the plastic component and leaving the threaded shank of the fastener exposed externally of the plastic part, the molded plastic part can be easily attached to any component having a suitable opening into which the threaded shank can pass for attachment thereto.

Conventional fasteners suffer from the problem of having high profiles on the head portion, thus requiring substantially thicker plastic components to encapsulate the head portion. Conventional fasteners also suffer from having low spin-out torque values, e.g. the amount of torque applied to the threaded shaft of the fastener that will cause the head portion to break away from the plastic encapsulation. Conventional fasteners typically have a relatively high pull-out force values, e.g. the amount of force required to pull the fastener out of the molded plastic component. Pull-out forces are resisted by the size and shape of the head portion of the fastener over which the plastic is encapsulating. Generally, the larger and flatter the head portion is on the underside of the head portion.

Spin-out forces are typically resisted by the shape of the head portion. For example, a carriage head having a round, semi-circular head would have a relatively low spin-out torque value. Square-headed fasteners, however, have a relatively high spin-out torque value because of the shape of the corners embedded into the plastic material forming the molded component. Hex-head fasteners would, therefore, have an intermediate spin-out torque value between a carriage head and a square head.

Another problem associated with the insert molding of fasteners into plastic components is the localized stress created in the plastic material by the shape of the head portion of the fastener. Square-headed fasteners, for example, have a significant amount of localized stress at the corners of the head portion where the plastic material has to flow around the sharp corner of the head portion. Thus, a carriage head fastener would generate much lower localized stresses in the plastic material, but have a highly undesirable spin-out torque value for most plastic part applications in the automotive industry.

Prior art fasteners have been provided with a variety of head shapes into which a wide variation of recesses are formed for engagement of tools for manipulating the fasteners. Such fastener configurations are found in U.S. Pat. No. 1,910,182, ranted to Peter Robertson on May 23, 1933, in which the recess in the head portion is adapted to be engaged by either a flat-head screwdriver or a square socket driver. In U.S. Pat. No. 2,556,155, issued to Domnic Stellin on Jun. 5, 1951, a variety of recess shapes are disclosed to increase the utilization of the fastener with differently shaped sockets and/or screwdrivers. Similarly, U.S. Pat. No. 5,358,368, issued to Gary Conlin, et al on Oct. 25, 1994, teaches a fastener head that can be engaged with either a flat-head or Philips-type screwdrivers or by a square socket driver. Substantially the same head configuration is taught in U.S. Pat. No. 5,674,037, issued to Cheug-chuan Lu on Oct. 7, 1997, except that the linear slot for the engagement of a flat-head screwdriver is oriented diagonally with respect to the Philips recess and the socket recess.

Other fastener configurations are taught in U.S. Pat. No. 5,713,705, issued to Carl Grunbichler on Feb. 3, 1998, in which the high profile head portion is formed with a narrow portion creating a torque limiting effect in which the upper half of the head portion can separate from the lower half. A fastener with compound recesses in the head portion is disclosed in U.S. Pat. No. 6,302,632, issued to Chao-Wei Lin on Oct. 16, 2001, could provide increased spin-out torque resistance with the convoluted head recesses, but would suffer substantially from localized stresses in the plastic material if utilized in an insert molding process due to the sharp angles formed in the head portion. A particularly formed sidewalk bolt is disclosed in U.S. Pat. No. 6,682,283, issued to Gregory Mann, et al on Jan. 27, 2004, although the rounded head would provide little resistance to spin-out torque in an insert molding utilization. A compound, multiple part fastener used for mounting hybrid composite access panels is depicted in U.S. Pat. No. 5,569,008, issued on Oct. 25, 1996, to John Chapkovich.

Accordingly, it would be desirable to provide an improved fastener configuration that would be particularly effective in utilization with insert molding processes, while providing high spin-out torque and pull-out force values with minimal localized stress in the plastic material encapsulating the portion of the fastener.

SUMMARY OF THE INVENTION

It is an object of this invention to overcome the aforementioned disadvantages of the known prior art by providing a fastener that is configured for use in insert molding processes.

It is another object of this invention to provide a fastener that provides maximum spin-out torque and pull-out force values when insert molded into a plastic component.

It is a feature of this invention that the fastener has a circumferential land area on the underside of the head portion.

It is an advantage of this invention that the circumferential land portion improves stud pull-out resistance.

It is another feature of this invention that the head portion of the fastener incorporates a contoured shape to improve spin-out torque resistance.

It is still another feature of this invention that the underside of the head portion of the fastener is formed with a square face to improve spin-out torque resistance.

It is yet another feature of this invention that the shape of the head portion of the fastener has rounded corners to reduce localized stresses in the plastic material encapsulating the head portion.

It is another advantage of this invention that the rounded contours of the head portion of the fastener is compatible with molding processes to permit the plastic material to flow around and encapsulate the head portion.

It is still another advantage of this invention that the top surface of the head portion is convoluted in shape to provide improved engagement between the fastener head portion and the plastic material encapsulating the head portion in the molding process.

It is still another object of this invention to provide a stud fastener that is highly acceptable in insert molding processes.

It is yet another feature of this invention that the head portion of the fastener has a low profile for use in insert molding processes.

It is yet another object of this invention to provide a fastener for utilization in insert molding processes for manufacturing plastic components that is durable in construction, inexpensive of manufacture, facile in assemblage, and simple and effective in use.

These and other objects, features and advantages are accomplished according to the instant invention by providing a fastener configured for use in the manufacture of molded plastic components that will be subsequently attached to other components by the fastener. The low profile head portion of the fastener has a rounded contoured and convoluted top surface to facilitate the flow of plastic material around the head portion during the molding process. The underside of the head portion is formed with a square face surrounded circumferentially by circumferential land surfaces that provides a high pull-out force resistance for the fastener. The square face on the underside and convoluted top surface of the head portion provides a high spin-out torque resistance without sacrificing the pull-out force resistance. The rounded edges of the head portion are compatible with molding processes to allow the flow of plastic material to fully encapsulate the head portion within the molded plastic component.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Figure 1:
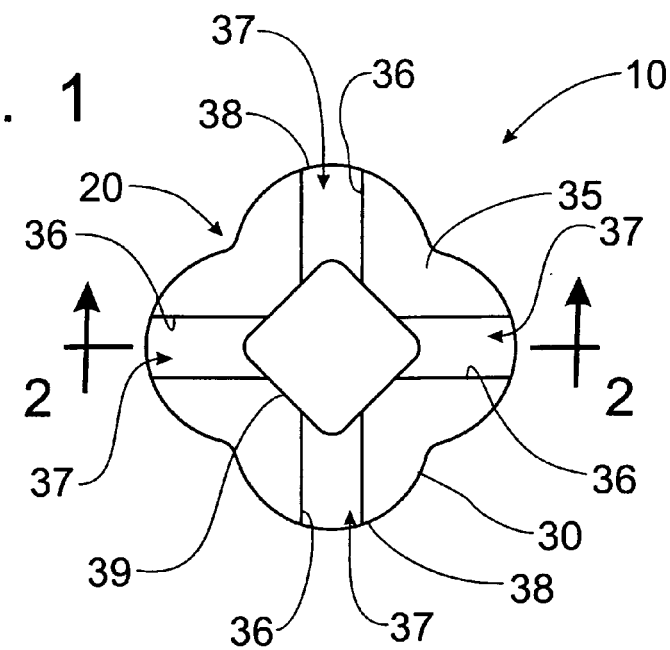
FIG. 1 is a top plan view of the head portion of a fastener incorporating the principles of the instant invention.

Referring to the drawings, FIGS. 1–7, a fastener incorporating the principles of the instant invention can be seen. The fastener 10 is designed for use in insert molding processes where the fastener 10 is placed into a mold having a shape corresponding to the plastic component to be formed thereby such that the shank portion 15 of the fastener 10 projects outwardly from the plastic material being inserted into the mold, with the head portion 20 encapsulated in the plastic material. The shank portion 15 can be threaded or be formed as a push-pin as is typical in use in the automotive industry.

The head portion 20 has a lower part 25 and an upper part 30. Each of the upper and lower parts 25, 30 is preferably about three millimeters in height (measured in relation to the axis of the shank 15) to provide a low profile head portion 20 that will encapsulate in conventionally molded plastic components. Blow-molded plastic components are formed typically with a thickness of three millimeters of plastic. Accordingly, forming the two parts of the head portion 20 with vertical heights of about three millimeters provides satisfactory encapsulation of the head portion 20, as will be described in greater detail below.

Figure 2:
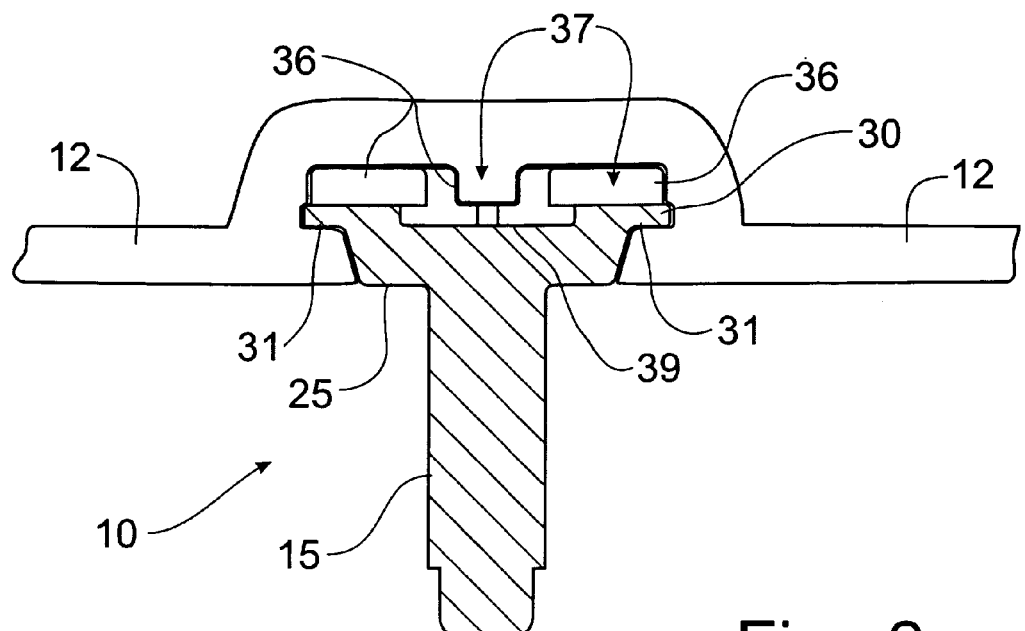
FIG. 2 is a cross-sectional view of the fastener taken along lines 2—2 of FIG. 1 to depict an elevational view of the interior of the convoluted top surface of the head portion molded in a representative material.
Figure 3:
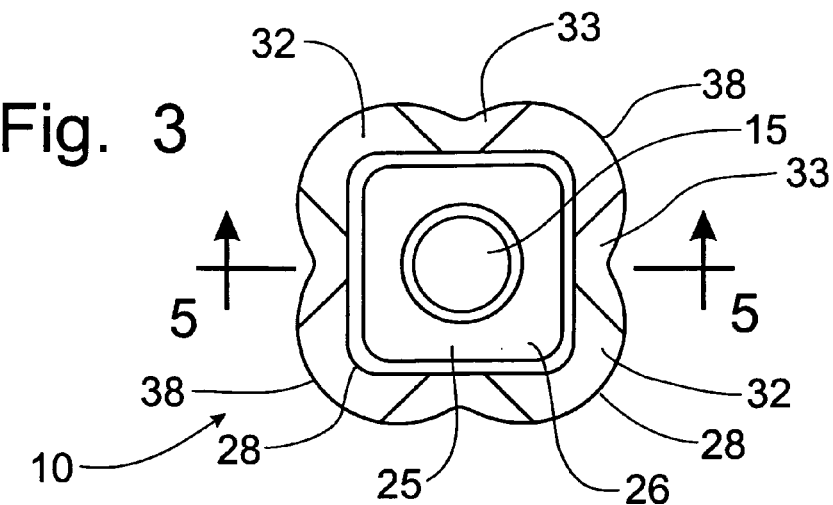
FIG. 3 is a bottom plan view of the fastener.
Figure 4:
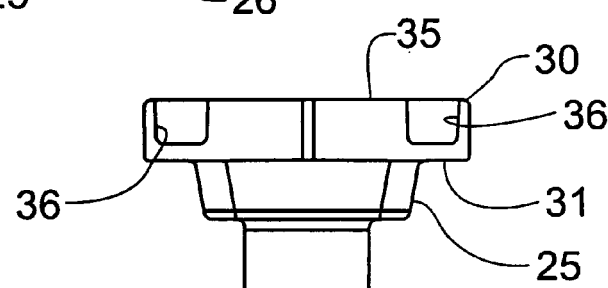
FIG. 4 is an elevational view of the fastener.
Figure 5:
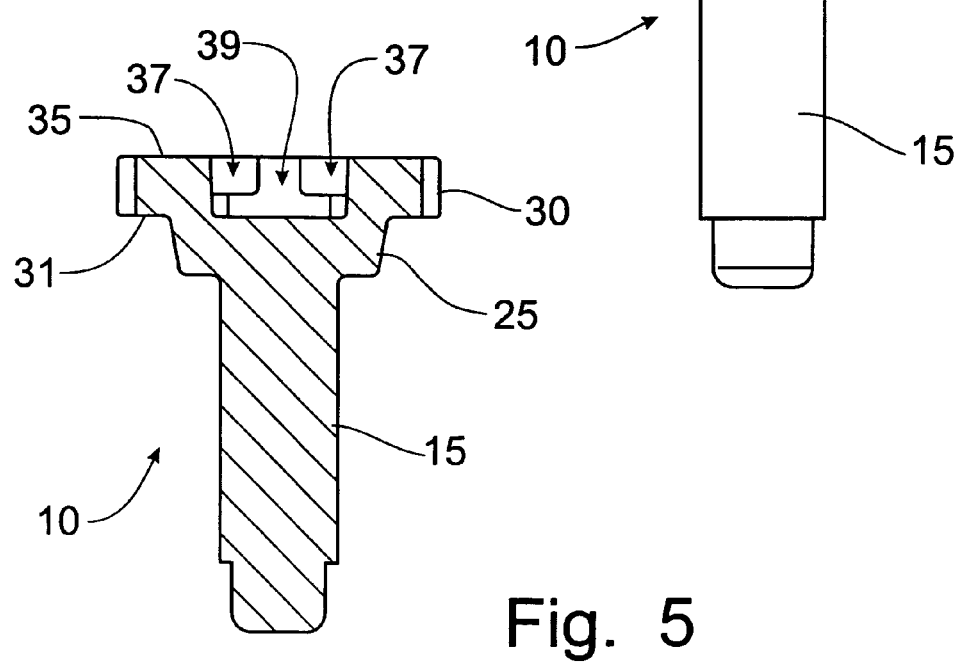
FIG. 5 is a cross-sectional view of the fastener taken along lines 5—5 of FIG. 3.
Figure 6:
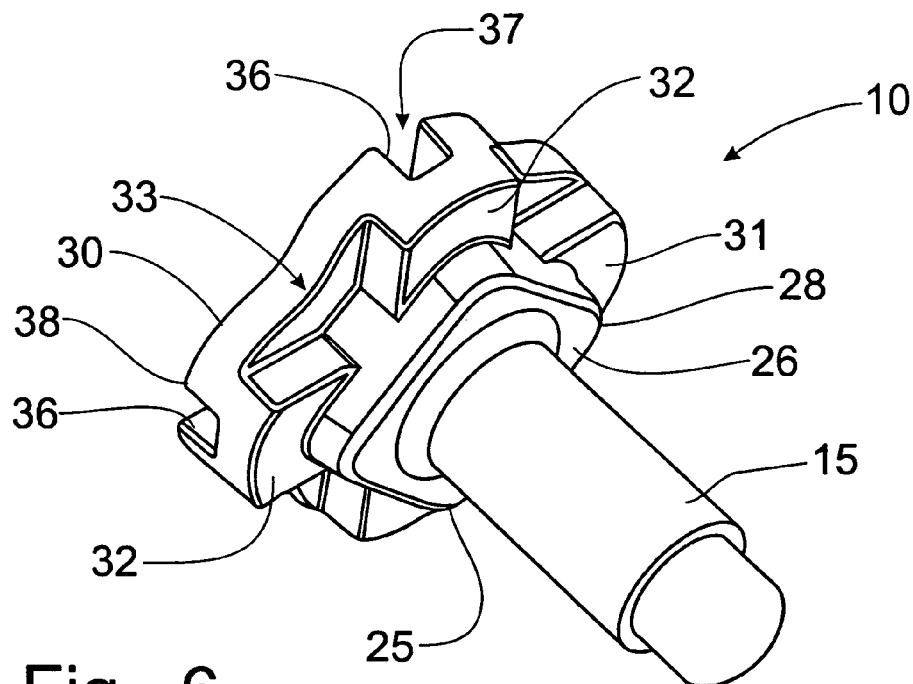
FIG. 6 is an underside perspective view of the fastener.
Figure 7:
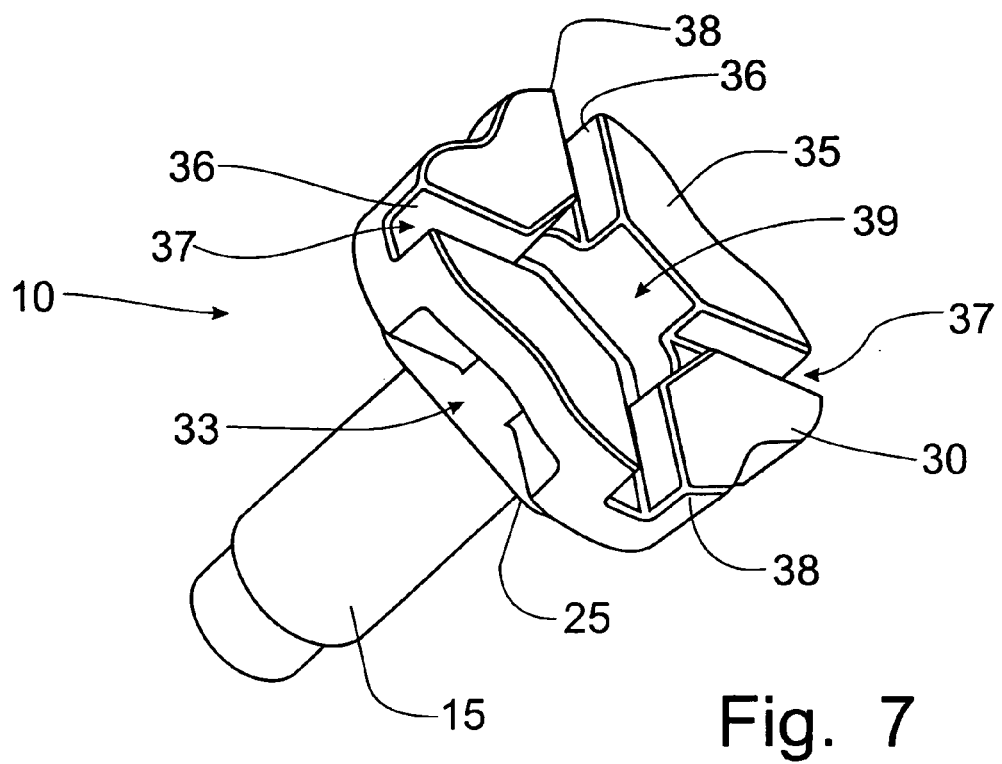
FIG. 7 is a top perspective view of the fastener.
Figure 8:
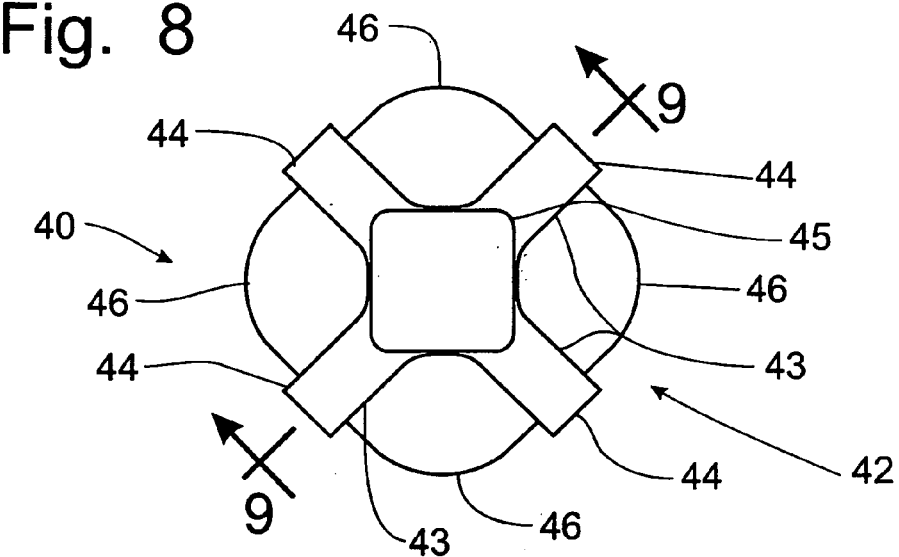
FIG. 8 is a top plan view of the head portion of an alternative embodiment of a fastener incorporating the principles of the instant invention.

As best seen in FIGS. 2–6, the head is formed having convoluted upper and lower surfaces. As used herein, "convoluted" is defined as including at least one surface irregularity selected from the group consisting of recesses, grooves and protuberances. The underside of the head portion 20 is formed with the lower part 25 in the general shape of a square face 26 in which the shank 15 is centrally located. The underside 31 of the upper part 30 forms a circumferential land area 32 extending around the square face 26 to provide increased engagement with the plastic material 12, as is generally depicted in FIG. 2. Furthermore, the underside 31 of the upper portion 30 is also formed in a convoluted shape, best depicted in FIG. 6, having recesses 33 into the circumferential land area 32 to provide enhanced engagement with the plastic material 12 to increase spin-out torque resistance. The lower part 25 is preferably tapered from the joinder with the upper part inwardly toward the shank portion so as to provide a sloped surface against which the plastic material will bear to help increase pull-out force resistance.

The top surface 35 of the upper portion 30 of the fastener 10 is also formed in a convoluted shape having both recesses and grooves, such as the perpendicularly oriented grooves 36 cut diagonally across and into the top surface 35 to form channels or recesses 37 into which the plastic material can flow to enhance engagement and encapsulation of the head portion 20. At the center of the top surface 35, a deep square recess 39 is formed into the upper part 30 substantially to the level of the lower part 25, but nonetheless at a depth greater than the recesses 37 formed by the grooves 36. Preferably, the recesses 33 in the under surface 31 of the upper part 30 are located between the channels or recesses 38 formed by the grooves 36 in the top surface 35 of the upper part 30. The multi-depth convoluted top surface 35 provides many valleys into which the plastic material 12 can flow to promote enhanced engagement between the head portion 20 and the plastic material, thus increasing spin-out torque resistance.

The head portion 20 is also formed with rounded corners 38, particularly around the outer periphery of the upper part 25, but also on the corners 28 of the lower part 25. These rounded corners 28, 38, facilitate the flow of plastic material 12 around the convoluted periphery of the head portion 20. The more complete the material flows into the recesses and valleys and around the corners of the head portion 20, the higher the spin-out torque resistance will be.

Preferably, the fastener 10 is placed into the component mold such that the underside of the square face 26 of the lower part 25 is and will be exposed on the surface of the component part after formation thereof, with the shank portion 15 projecting outwardly therefrom. Plastic is distributed throughout the mold in a conventional manner, such as by injection molding or blow molding techniques, until the mold is filled appropriately with the plastic material 12, and the head portion 20 of the fastener 10 is encapsulated, as is represented in FIG. 2. With the plastic material 12 filling all of the recesses and valleys of the head portion 20, the engagement between the plastic material 12 and the fastener 10 promotes a high spin-out torque resistance.

Referring now to FIGS. 8–13, an alternative embodiment of a fastener 40 for use with insert molding applications can best be seen. As with the other fastener 10, the head portion 42 is formed at the terminus of the shank portion 41 that is formed as described above to permit utilization in the final configuration. The head portion 42 is formed in a convoluted shape that includes a pair of perpendicularly oriented grooves 43 that terminate in respective tabs 44 that project outwardly from the head portion 42 to provide greater torque resistance for the fastener 40. A central deep square recess 45 is also formed into the top surface of the head portion 42 in substantially the same manner as described above with respect to the other fastener embodiment 10. The crossing grooves 43 form channels that define raised rounded corners 46 that permit a smooth flow of plastic material around the head portion 42 and into the channels formed by the grooves 43 and the square recess 45.

Figure 9:
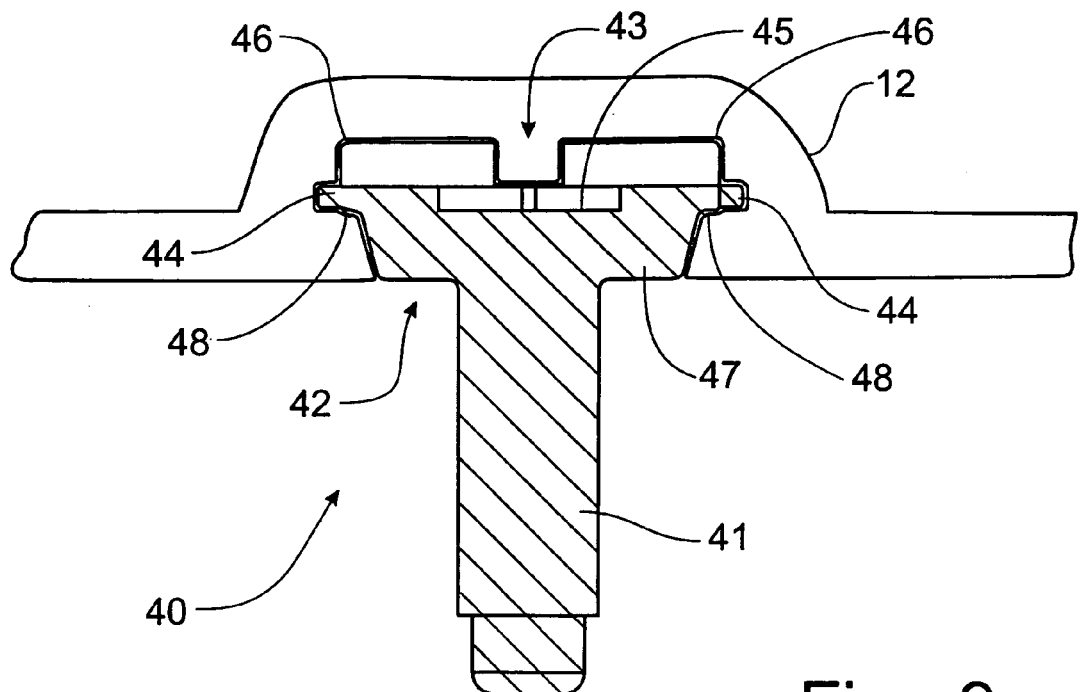
FIG. 9 is a cross-sectional view of the fastener taken along lines 9—9 of FIG. 8 to depict an elevational view of the interior of the convoluted top surface of the head portion molded in a representative material.
Figure 10:
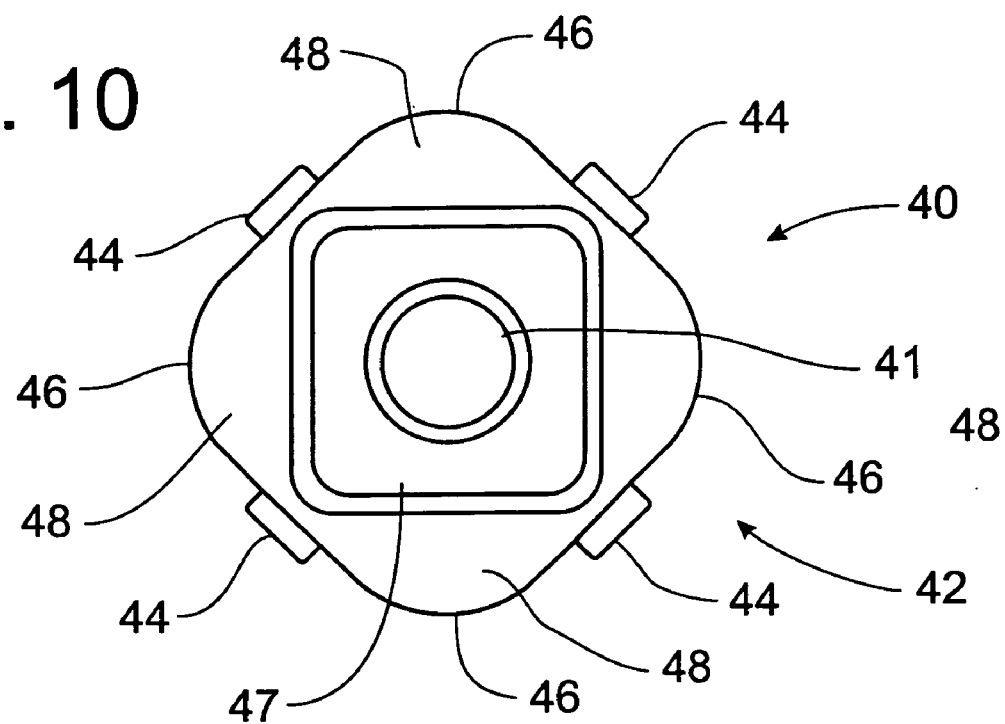
FIG. 10 is a bottom plan view of the fastener shown in FIGS. 8 and 9.
Figure 11:
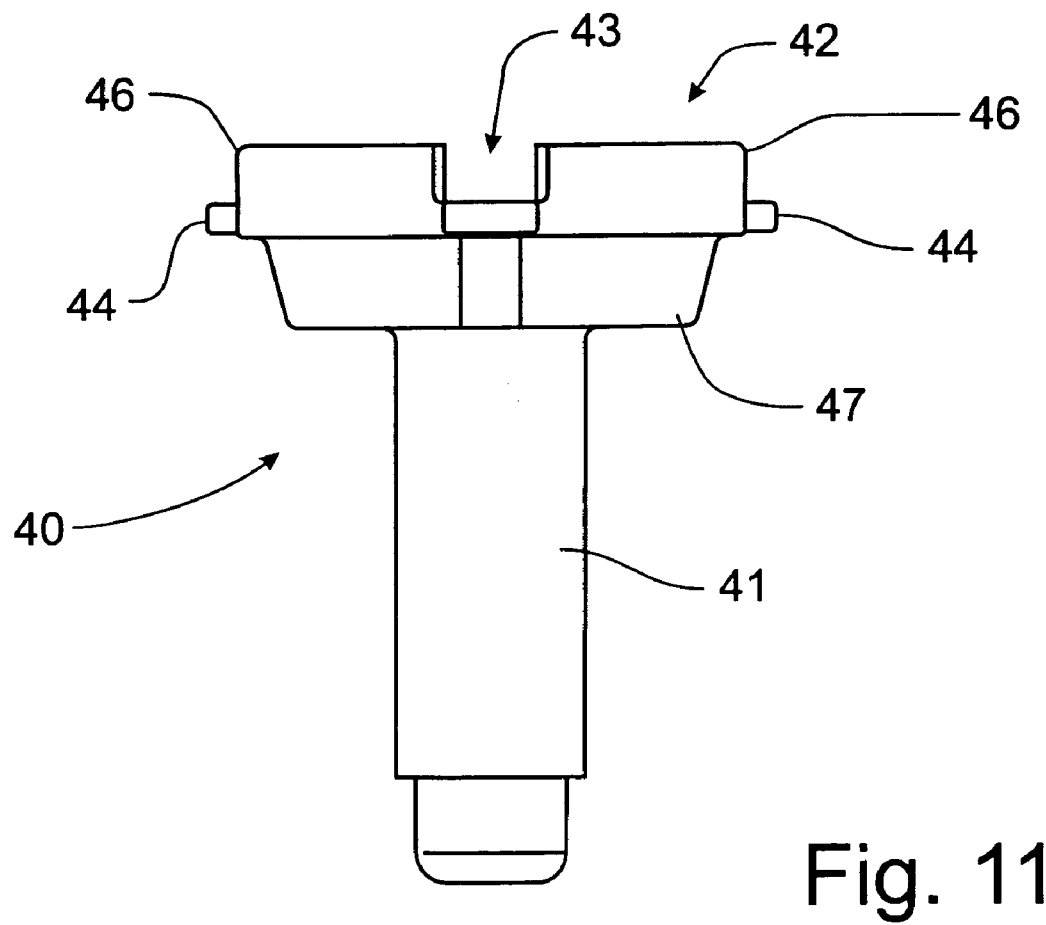
FIG. 11 is an elevational view of the fastener shown in FIGS. 8–10.
Figure 12:
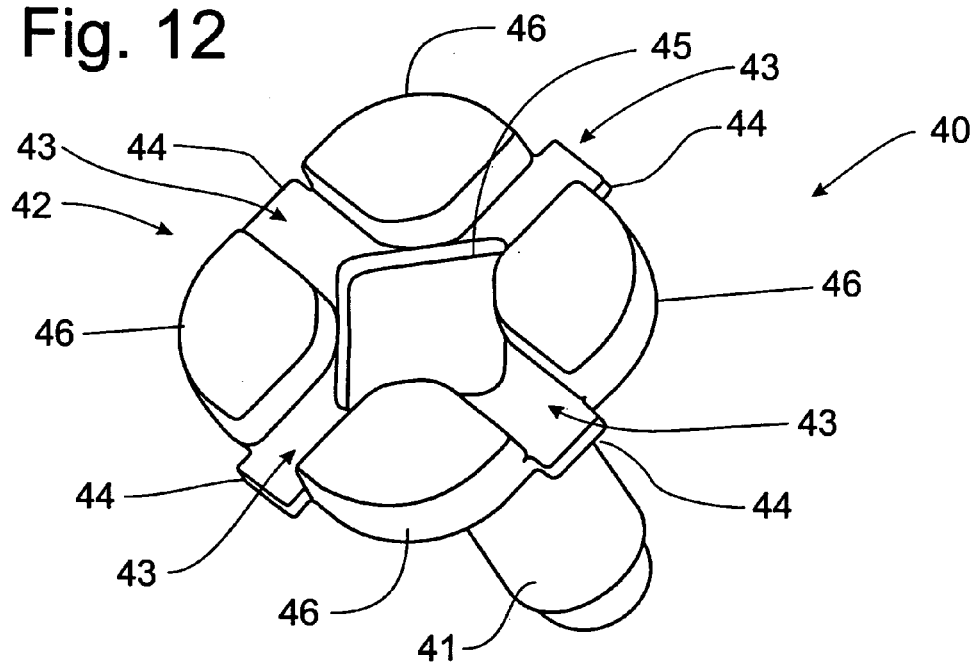
FIG. 12 is a top perspective view of the fastener shown in FIGS. 8–10.
Figure 13:
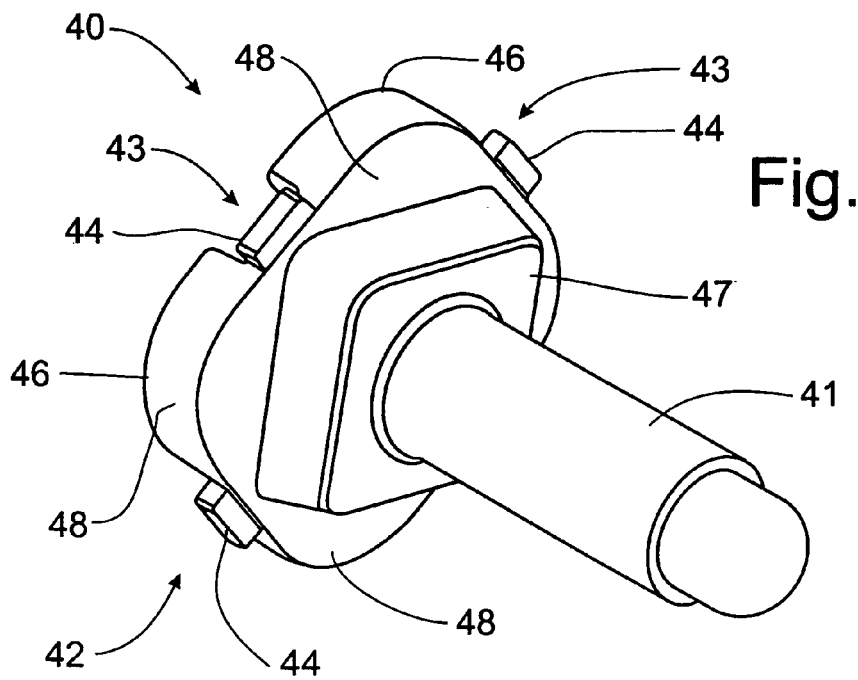
FIG. 13 is an underside perspective view of the fastener shown in FIGS. 8–10.

The underside of the head portion 42 is also formed with a square face 47 that is oriented with the corners thereof substantially aligned with the tabs 44, thus defining circumferential lands 48 on the underside of the head portion 42 between the square face 47 and the edges of the rounded corners 46. As with the other fastener embodiment 10, the molding of the plastic material level with the square face 47 where the shank portion 41 protrudes therefrom, as is best seen in FIG. 9, leaves a substantial thickness of the plastic material corresponding to the circumferential lands 48 that enhance the pull-out resistance of the fastener 40. The outwardly projecting tabs 44 also aid in resisting fastener pull-out.

As described above, the fastener 40 is placed into the mold to have plastic material flow around the head portion 42. By providing the recesses channels formed by the grooves 43 and the deep square recess 45 with rounded surfaces and corners, the plastic material conforms tightly to the convoluted surface of the head portion 42 to create an engagement therebetween that resists torque forces imposed on the fastener 40, while the plastic material beneath the circumferential lands 48 and the outwardly projecting tabs 44 provide excellent pull-out resistance. As with the other fastener embodiment 10, the square face 47 on the underside of the head portion 42 is tapered from the circumferential lands 48 to the level where the shank portion 41 protrudes to enhance pull-out resistance of the fastener 40.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A fastener for use in insert molded plastic components comprising:

a head portion having an upper part and a lower part, said upper part being formed in a convoluted configuration on a top surface defining recesses into said top surface, said top surface being formed with a pair of grooves oriented substantially perpendicularly to one another to define a first portion of said recesses into said top surface of said head portion and with a deep recess positioned centrally on said top surface with said grooves cutting through said deep recess, said upper part of said head portion also being formed with rounded corners on a periphery of said upper part, said lower part being formed in a geometrical shape smaller than said upper part such that an under surface of said upper part forms a circumferential land area around said lower part; said lower part of said head portion also being formed with a generally square face oriented generally perpendicularly to said shank portion, said generally square face being formed with rounded corners and a shank portion projecting centrally outwardly from said lower part.

2. The fastener of claim 1 wherein said deep recess is formed in a rectangular shape and defines a second portion of said recesses having a depth from said top surface greater than said first portion of said recesses formed by said grooves.

3. The fastener of claim 1 wherein additional recesses are also formed into said under surface are positioned between said first portions of said recesses in said top surface formed by said perpendicularly oriented grooves.

4. The fastener of claim 1 wherein said lower part is formed with a taper defining a sloped surface such that said lower part narrows toward said shank portion.

5. In a fastener for use in the formation of plastic components by an insert molding process, said fastener including a head portion having a shank portion extending generally perpendicularly thereto to project outwardly therefrom, the improvement comprising:

said head portion including an upper part being formed in a convoluted configuration on both a top surface and an under surface thereof, said convoluted configuration defining first recesses into said top surface and second recesses into said under surface, said top surface being formed with a pair of grooves oriented substantially perpendicularly to one another to define a first portion of said first recesses into said top surface of said head portion, said second recesses being positioned between said first portions of said first recesses formed in said top surface by said perpendicularly oriented grooves; and said head portion further including a lower part being formed in a geometrical shape smaller than said upper part, said convoluted configuration forming a circumferential land area around said lower part, said shank portion being located centrally on said lower part.

6. The fastener of claim 5 wherein said top surface is formed a deep recess positioned centrally on said top surface with said grooves cutting through said deep recess.

7. The fastener of claim 6 wherein said deep recess is formed in a rectangular shape and has a depth from said top surface greater than said first portion of said first recesses formed by said grooves.

8. The fastener of claim 7 wherein said lower part has a tapered periphery such that said lower part adjacent said shank portion is smaller than said lower part adjacent said upper part.

9. The fastener of claim 8 wherein said upper part of said head portion is formed with rounded corners on the periphery of said upper part, said lower part of said head portion being formed with a generally square face oriented generally perpendicularly to said shank portion, said generally square face being formed with rounded corners.

10. A fastener head comprising:
an upper part being formed in a convoluted configuration on both a top surface and an under surface thereof defining first recesses into said top surface and second recesses into said under surface, said second recesses being positioned between said first recesses such that said first and second recesses are not vertically aligned, said upper part further being formed with a plurality of rounded corners around a circumferential periphery thereof, and a lower part being formed in a rectangular shape smaller than said upper part such that said under surface of said upper part forms a circumferential land area around said lower part, said lower part being formed with rounded corners.

11. The fastener head of claim 10 wherein said top surface is formed with:
a pair of grooves oriented substantially perpendicularly to one another to define a first portion of said first recesses into said top surface of said head portion; and
a deep recess positioned centrally on said top surface with said grooves cutting through said deep recess and having a depth from said top surface greater than said first portion of said first recesses formed by said grooves.

12. The fastener head of claim 11 wherein said lower part has a tapered periphery such that said lower part adjacent said shank portion is smaller than said lower part adjacent said upper part.

* * * * *